Dec. 27, 1927.
D. C. KERCKHOFF ET AL
1,653,629
PASTEURIZING APPARATUS
Original Filed Nov. 19, 1923
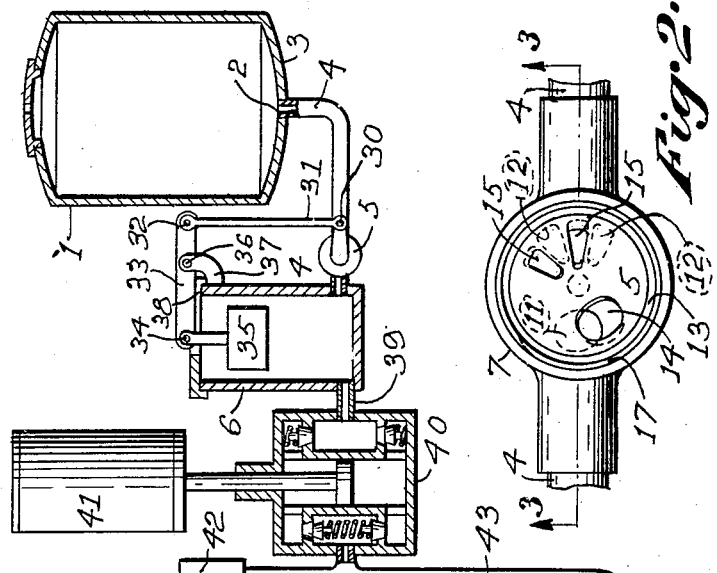
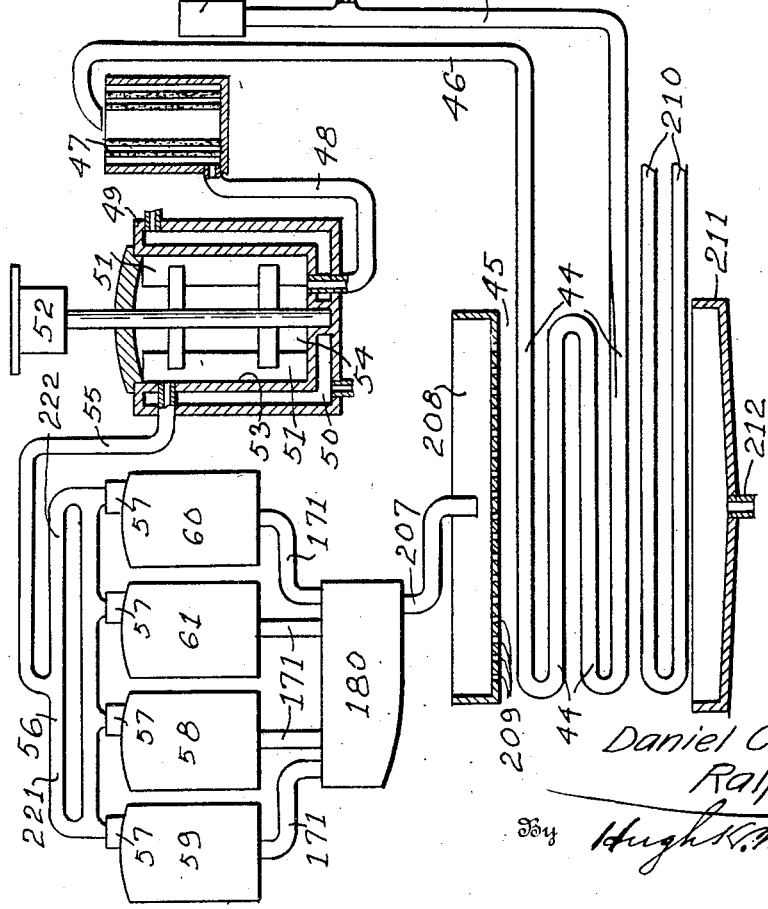
Inventors
Daniel C. Kerckhoff,
Ralph Copp,
By Hugh K. Wagner
Attorney.

Patented Dec. 27, 1927.

1,653,629

UNITED STATES PATENT OFFICE.

DANIEL C. KERCKHOFF AND RALPH COPP, OF ST. LOUIS, MISSOURI, ASSIGNORS TO PEVELY DAIRY COMPANY, OF ST. LOUIS, MISSOURI, A CORPORATION OF MISSOURI.

PASTEURIZING APPARATUS.

Original application filed November 19, 1923, Serial No. 675,629. Divided and this application filed July 3, 1924. Serial No. 723,964.

This invention has to do with the art of Pasteurizing milk and the like, and is a division of our Patent No. 1,563,905, issued December 1, 1925.

In carrying out the conventional commercial process of Pasteurizing milk, the milk is pumped from a storage tank through a regenerative cooler or heat exchanger (where it receives a preliminary heating while simultaneously cooling the hot milk discharged from the Pasteurizing apparatus) to a filter, and in turn through a heater to be raised to the Pasteurizing temperature, and thence into a holding tank in which the milk is retained at the Pasteurizing temperature for the necessary length of time, and finally passes therefrom through the regenerative cooler to a receiver.

An object is to provide a constant flow of raw milk through the regenerative cooler.

Another object is to provide a constant flow of Pasteurized milk through the regenerative cooler.

Other objects and advantages will be apparent as the description proceeds.

While the invention includes the combined instrumentalities above-mentioned, it is to be understood that the aforesaid means are considered to be not only combinatively novel, but in so far as is known, certain of the devices going to make up such means are new in less combinations than the whole, and some capable of individual use, as will more clearly appear hereinafter.

In the accompanying drawings forming part of this specification, in which like numbers of reference denote like parts wherever they occur, Figure 1 is a diagrammatic view of the Pasteurization system;

Figure 2 is an elevational view of a sanitary and self-seating type of valve hereinafter referred to, taken looking from the cap side, the cap being removed and the valve in closed position;

Figure 3 is a longitudinal central sectional view taken on the line 3—3 of Figure 2, and showing the valve entirely open.

A storage tank 1 for containing the supply of raw milk (see Figure 1) has an opening 2 in its bottom 3, from which opening 2 a pipe 4 leads to a valve 5, which valve controls the flow of milk through said pipe 4 into equalizing tank or head vessel 6.

A valve housing 7 (Figures 2 and 3) for valve 5 contains inlet and outlet passages 8 and 9, respectively, which passages communicate with valve chamber 10 through openings 11 and 12 respectively in valve seat 13. Valve 5 has openings 14 and 15, which register with openings 11 and 12, respectively, when the valve is fully open. Valve chamber 10 is provided with an opening 16, which is internally threaded at 17 for the reception of an externally threaded plug or cap 18, which cap is screwed down until its annular shoulder 19 abuts against annular face 20 of housing 7. A square projection 21 on the outer side of plug 18 constitutes a means for engagement with a wrench. Valve seat 13 is preferably conical in shape, and communicates at its apex with a central bearing 22, which extends through housing 7, and contains stem 23, preferably formed integral at its inner terminus with valve 5, and having a lever 24 secured by a pin 25 to its outer projecting end 26. The area of inlet opening 11, and the combined area of the two outlet openings 12, are each equal to the area of cross-section of the passages 8 and 9 respectively, thus affording a nonconstricted passage for the free flow of milk therethrough when the valve is entirely open. This flow of milk over all parts of the valve, in conjunction with the movement of the valve on its seat, renders the valve practically self-cleaning. The pressure of the milk, also, keeps the valve 5 against its seat, and this pressure is always present whenever the pipe 4 is full of milk, because the opening 11 is never entirely closed, but is halfway open even when the valve 5 has rotated sufficiently to entirely close the pair of openings 12.

Passages 8 and 9 are enlarged at their outer ends to receive the pipe 4, which is secured therein by soldering at the enlargements 27. The inside surface 28 of pipe 4 can, therefore, be, and is, an uninterrupted and smooth continuation of the inside surfaces 29 of the passages 8 and 9. This manner of attaching pipes to fittings is used throughout the system because it affords no pockets or crevices where milk may stagnate and where bacteria can multiply unduly.

Lever 24 is pivoted at 30 to link 31, which link is pivoted at 32 to lever 33, which lever is pivoted at 34 to float 35 and, also, at 36 to bracket 37 on tank 6. When tank 6 is empty, float 35 descends until lever 33 strikes against edge 38 on tank 6, in which position valve 5 is wide open. When milk passes from tank 1 through pipe 4 into tank 6, valve 5 remains fully open until the milk rises high enough in tank 6 to raise float 35, which thereby operates valve 5 through the intermediacy of lever 33, link 31 and lever 24 to reduce the flow through pipe 4. A substantially constant head of milk is thus assured in the tank 6.

A pipe 39 leads from tank 6 into pump 40, which pump may be driven by any suitable motor or engine 41, and has associated therewith the usual air chamber 42 for equalizing the flow therefrom. The substantially constant head of milk in tank 6 tends to a practically constant flow of milk from the pump 40, irrespective of any variation of head in supply tank 1.

A pipe 43 leads from pump 40 to the tubes 44 in the regenerative cooler or heat exchanger 45, and from thence a pipe 46 leads to filter 47. In its passage through the tubes 44 the milk becomes heated to approximately 120°, or sufficiently to allow the butter fat and other essential constituents thereof to pass through the filter 47.

From the filter 47 the purified milk passes through pipe 48 into heater 49. Heater 49 is heated by hot water having a temperature of approximately 170 degrees Fahrenheit and which circulates through the heater jacket 50. Heater 49 contains rapidly revolving paddles 51, which are driven by a motor 52 and which cause the milk to rise by centrifugal force along the interior side 53 of milk chamber 54, from whence it rises through pipe 55 to holder-tank-distributing pipe-circuit 56. In its passage through heater 49 the milk is heated to a Pasteurizing temperature, preferably to 142 degrees Fahrenheit.

Pipe circuit 56 supplies inlet valves 57, of Pasteurizing holders 58, 59, 60, and 61, respectively.

Pipes 171 connect the holders with the drop tank 180. The milk passes from the drop tank 180 through pipe 207 to trough 208 in cooler 45, from whence it descends through the orifices 209, in the bottom of trough 208, and trickles over the pipes 44, where it parts with part of its heat to the raw milk passing through the pipes 44, and then finally flows over the ammonia expansion pipes 210 into the bottom trough 211, from whence it passes through pipe 212 into any suitable receiver at a final temperature of approximately 40 degrees Fahrenheit.

The mode of operation of this apparatus will now be briefly described.

Raw milk flows from milk tank 1 through pipe 4 into equalizer tank 6, the constant head of milk therein causing an even flow of milk through pipe 39 into pump 40, which pumps the milk at an even flow, by virtue of the constant head in tank 6, into pipe 43 and thence through tubes 44 of heat exchanger 45, where the hot Pasteurized milk flowing over the outside of these tubes heats the raw milk therein to a temperature of approximately 120 degrees Fahrenheit. From tubes 44 the milk passes through pipe 46 to filter 47, where it is separated from any foreign matter, and then passes through heater 49, which heats the milk to a Pasteurizing temperature of preferably 142 degrees Fahrenheit and, also, forces it by centrifugal force through the pipe 55 to pipe-circuit 56, from whence it is distributed to the several Pasteurizing holders 58, 59, 60, and 61 in succession.

It is to be noted that there can be no cessation of flow anywhere in the pipe-circuit 56, no matter which particular inlet pipe happens to be open, because there are no dead ends, the flow dividing between the branches 221 and 222 and approaching the open inlet pipe from both directions. This makes for low bacteria content.

The steady flow from the pump, also, means a steady, even flow of raw milk through the regenerative cooler, and if the flow of hot milk from the Pasteurizer holders is constant, the exchange of heat from the hot milk to the raw milk will, also, be a constant factor, contributing to prevent uneven heating or scorching in the heater 49.

From the holders 58, 59, 60, and 61 the Pasteurized milk passes into drop tank 180, from whence a steady, even flow, attained by a float and valve mechanism therein, passes through pipe 207 to regenerative cooler 45, this steady flow contributing to the desirable results set forth in the preceding paragraph.

As a result of this exchange of heat, the Pasteurized milk is now at a temperature of approximately fifty-five degrees Fahrenheit and is further cooled down to 40 degrees Fahrenheit by any suitable means, and then is passed into a suitable receiver.

The stand-pipe or head vessel 6, together with the float 35, valve 5, and associated parts constitute one form of the automatic means, referred to in the following claims, for preventing undue variation in the flow of raw milk through the heat exchanger 45 or the heater 49; and the tank 180, and associated parts constitute an embodiment of the automatic means for preventing undue variation in the flow of Pasteurized milk through the heat exchanger.

Having thus described this invention, we hereby reserve the benefit of all changes in form, arrangement, order, or use of parts, as it is evident that many minor changes may be made therein without departing from the spirit of this invention or the scope of the following claims.

We claim:

1. In an apparatus for Pasteurizing liquids, a receiving vessel, a head vessel fed therefrom, automatic means for regulating the flow of liquid from the receiving vessel to the head vessel to maintain a constant head of liquid in the latter, a heater, and means for forcing liquid from said head vessel and elevating the liquid to a position for passage to said heater.

2. In an apparatus for Pasteurizing liquids, a receiving vessel, a head vessel fed therefrom, a regenerative coil, automatic means for regulating flow of liquid from the receiving vessel to the head vessel to maintain a constant head of liquid in the latter, a heater, and a pump for forcing liquid from the head vessel through said coil and elevating it to a position for passage to the said heater.

In testimony whereof we hereunto affix our signatures.

DANIEL C. KERCKHOFF.
RALPH COPP.